INVENTOR
Harry E. Massa

United States Patent Office 3,534,118
Patented Oct. 13, 1970

3,534,118
ALKYLATION OF EXTRACTOR BOTTOMS
OBTAINED IN ACID RECOVERY
Harry E. Massa, Prairie Village, Kans., assignor to Stratford Engineering Corporation, Madison, Mo., a corporation of Delaware
Continuation-in-part of application Ser. No. 495,191, Oct. 12, 1965. This application Mar. 13, 1969, Ser. No. 806,859
Int. Cl. C07c 3/54
U.S. Cl. 260—683.62                5 Claims

ABSTRACT OF THE DISCLOSURE

Spent alkylation acid separated from an alkylation reaction is reacted with olefin in a continuous process to produce dialkyl sulfates, the dialkyl sulfates are extracted with light hydrocarbons in an extraction step and the acidic phase, which includes water, polymeric organic contaminants and a significant quantity of monoalkyl sulfates, is passed to a separate alkylation zone and alkylated with isoparaffin to produce a separate alkylation product. The sulfuric acid catalyst in the second alkylation zone is derived from the sulfates during the alkylation reaction.

Figure 1:
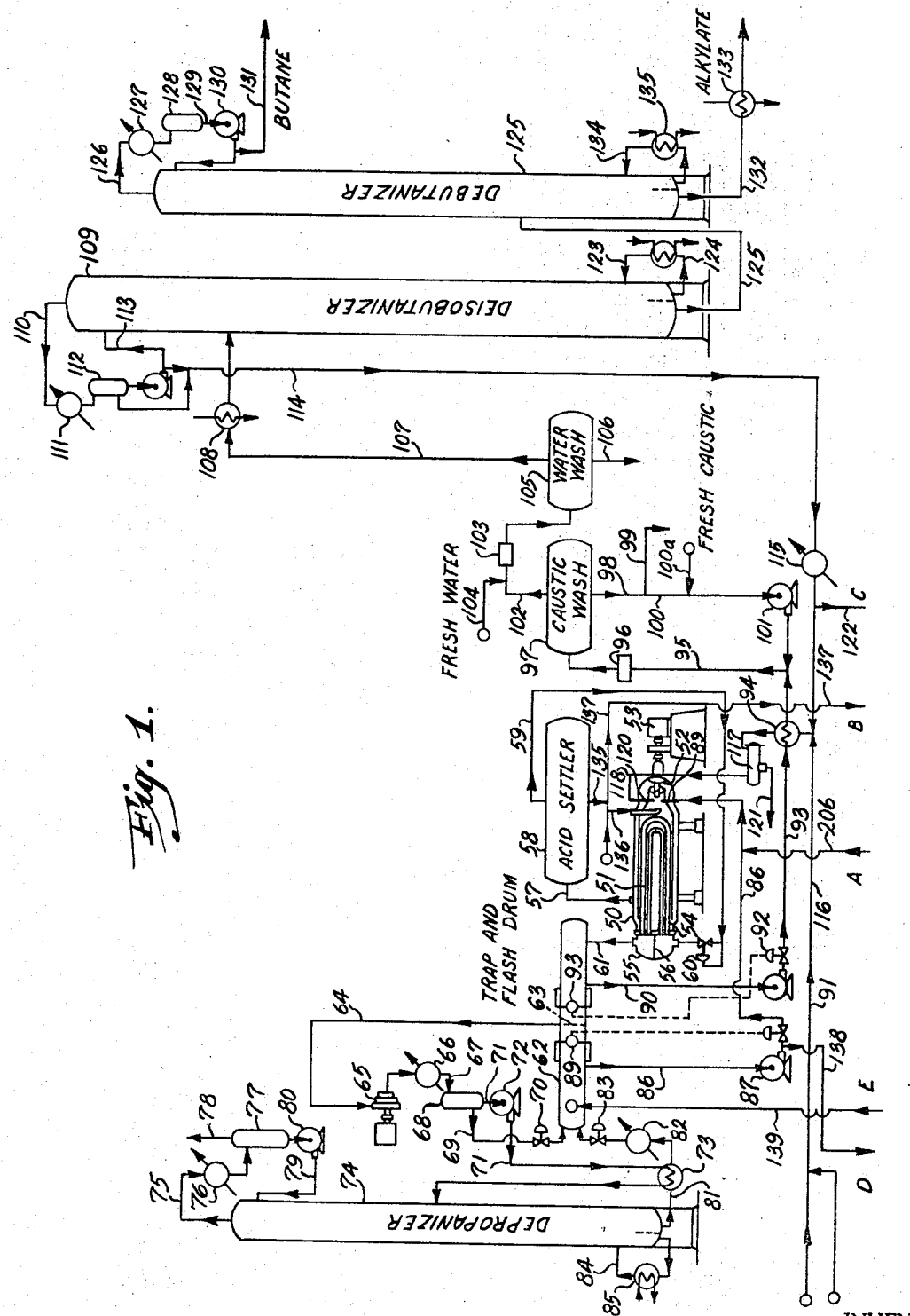

This application is a continuation-in-part of Massa Ser. No. 495,191, "Alkylation of Alkyl Sulfates" filed Oct. 12, 1965, now U.S. Pat. 3,442,972 which issued on May 6, 1969.

This invention relates to a sulfuric acid recovery process used in conjunction with sulfuric acid alkylation for the recovery and reuse of spent alkylation acid. It refers particularly to methods employed in and with said sulfuric acid recovery process wherein sulfuric acid in the spent acid is reacted with olefin in a continuous process to produce dialkyl sulfates. The process relates to improvements and modifications within and among the parts and process steps of a sulfuric acid recovery process wherein, in conjunction with the sulfuric acid alkylation process (wherein isoparaffinic hydrocarbons are alkylated with olefinic hydrocarbon and dialkyl sulfates in the presence of any sulfuric acid catalyst) the sulfuric acid in the spent acid is reacted with olefin, separated from catalyst impurities and returned to the alkylation reaction system.

The invention particularly relates to the alkylation with isoparaffinic hydrocarbons (preferably isobutane) of hydrocarbons in the form of alkyl sulfates in spent acid normally (per Massa 495,191, supra) rejected from the sulfuric acid recovery process. The purpose of such alkylation is the recovery of any olefins present in said spent acid in the form of alkyl sulfates, with a consequent reduction of the hydrocarbon content of this spent acid.

In the sulfuric acid recovery process of the Massa U.S. Ser. No. 495,191, supra, the spent acid line from the sulfuric acid recovery process generally goes out of the system from the extraction step, typically from a rotating disc contactor. There is a very high hydrocarbon presence in this spent acid. Its presence in the acid can cause problems of excessive temperature and reduced capacity when this acid is burned in conventional acid burning regeneration processes.

The SARP spent acid rejected from the extractor also contains the catalyst contaminants (acid oils and water) originally present in the alkylation unit. It would be undesirable to return this stream to the main alkylation reactor(s) since this would mean returning the catalyst contaminants to the body of catalyst from which they had already been removed. The basic question is, how avoid recycle of the bad acid contaminants and yet remove the high hydrocarbon content from the RDC or extractor bottoms?

The spent acid produced from the sulfuric acid recovery process (of Massa Ser. No. 495,191, supra, normally rejected from the extraction step as bottoms from the extractor or RDC (rotating disc contactor)), although in quantity only about ⅓ that of the conventional spent acid which is produced from the alkylation unit(s) served by the SARP (sulfuric acid recovery process) unit, as mentioned above, contains a very considerably greater proportion of hydrocarbons present in the SARP extractor spent acid than those in the alkylation spent acid. Such hydrocarbons are present in the SARP spent acid largely as alkyl sulfates. Thus, a typical SARP spent acid from the extractor may contain 79% by weight of alkyl sulfates. These alkyl sulfates will react with isoparaffinic hydrocarbons such as isobutane, in the presence of strong sulfuric acid catalyst, whereby to produce an alkylate product and sulfuric acid.

Therefore, the solution to the problem above stated which I propose is the use of a separate alkylation step with an initial charge of strong acid to make up catalyst therefor. If one alkylates enough of the alkyl sulfate in this separate alkylation step, there is left behind sufficient acid catalyst to provide a continuous process. Thus, there are two options, with or without strong acid catalyst added to the separate alkylation step after start-up thereof. It is thus possible to get monoalkyl sulfates (monopropyl sulfate) and dialkyl sulfates (dipropyl sulfates) out by alkylation thereof in the SARP extractor bottoms spent and, further, the propylene values thereout by alkylation.

The alkylate thus produced is a high quality product of comparable value to that produced in the main alkylation unit. By recovering as alkylate the olefinic values otherwise discarded, the overall yield of the combined alkylation-SARP system is improved in terms of quantity of alkylate produced per quantity of olefin fed.

This invention thus relates to the alkylation with isoparaffinic hydrocarbons (preferably isobutane) of hydrocarbons in the form of alkyl sulfates in spent acid normally (per Massa 495,191, supra) rejected from the sulfuric acid recovery process. The purpose of such alkylation is the recovery of any olefins present in said spent acid in the form of alkyl sulfates, with a consequent reduction of the hydrocarbon content of the spent acid.

FIG. 1 is a schematic flow diagram of a sulfuric acid alkylation process wherein a typical efficient alkylation reaction and reactor system is illustrated, utilizing indirect heat exchange of the alkylation reaction effected by effluent refrigeration. The flow lines tieing the alkylation reactor system of FIG. 1 to the sulfuric acid recovery system and reactor of FIG. 2 are at the right-hand side of FIG. 1.

Figure 2:
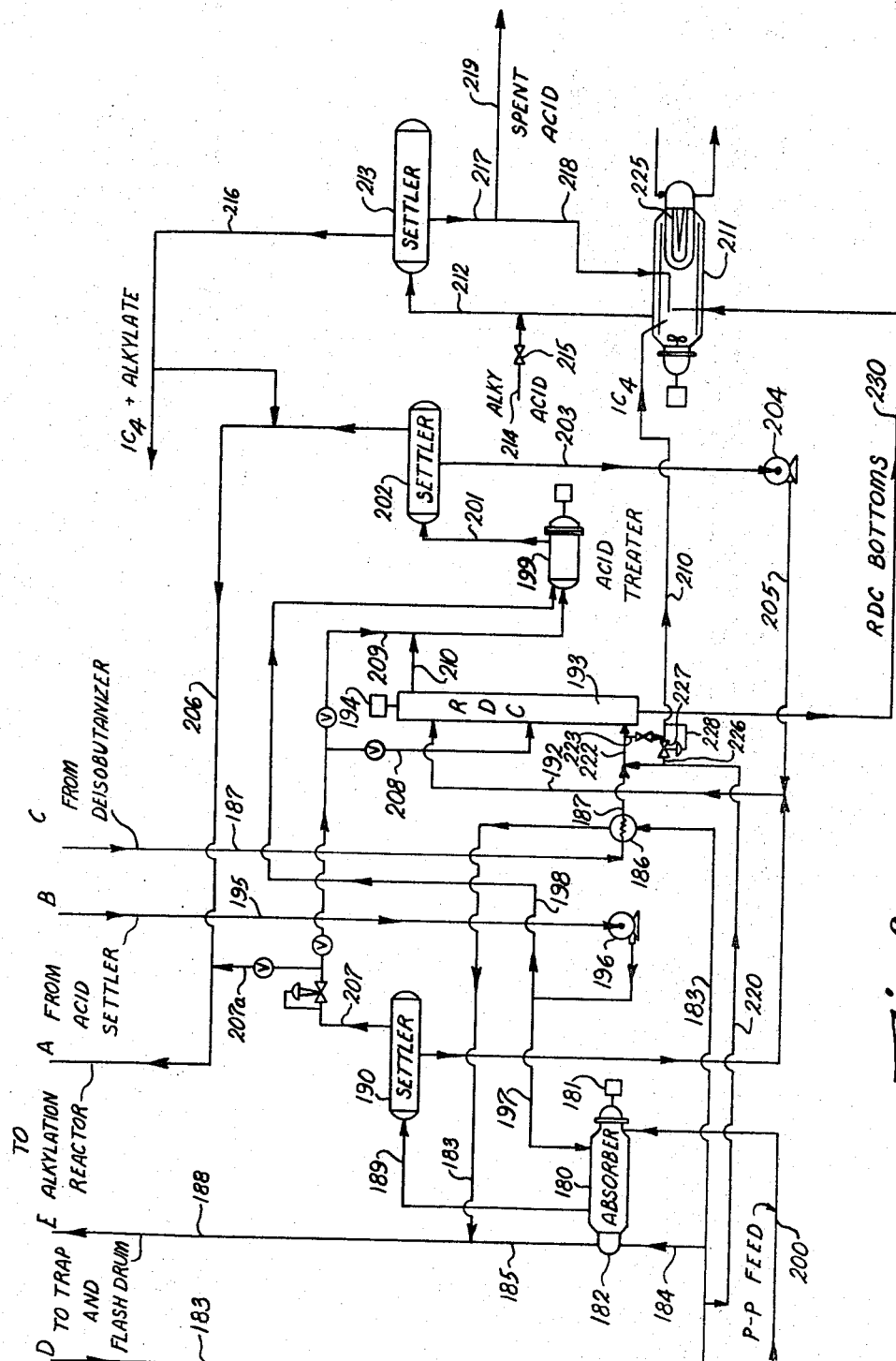

FIG. 2 is a schematic flow diagram of a sulfuric acid recovery system to which is coupled a separate alkylation reactor system for handling the extractor bottoms of the SARP system, the lines connecting this SARP system and the associated alkylation reactor with the FIG. 1 system being at the left side of FIG. 2.

OBJECTS

An object of this invention is to provide an improved sulfuric acid recovery process coupled with a sulfuric acid alkylation process.

Another object of the invention is to recover additional spent sulfuric acid alkylation catalyst for reuse in a sulfuric acid alkylation process from a sulfuric acid recovery process than has yet before been recovered.

Another object of the invention is to provide a sulfuric acid alkylation process and a sulfuric acid recovery process associated therewith wherein marked savings in acid and markedly decreased acid consumption are achieved by virtue of a greatly improved sulfuric acid recovery process.

Another object of the invention is to provide a method of processing extractor bottoms from a sulfuric acid recovery process coupled with a sulfuric acid alkylation process whereby to recover hydrocarbon values in the form of alkyl sulfates therefrom, thereby also to prepare the discard acid from the sulfuric acid recovery process for acid burning and ultimate recovery.

Another object of the invention is to provide a process to convert normally discarded alkyl sulfates to a valuable alkylate product thereby to increase the alkylate yield of the akylation-SARP system.

Another object of the invention is to provide means and methods for handing the sulfuric acid recovery process spent acid rejected from the extractor step in such a manner to recover all of the hydrocarbon values therein, for return thereof to the alkylation process, while not returning the undesired catalyst contaminants to the alkylation process.

Another object of the invention is to provide means and methods of handling contained alkyl sulfates from the extractor step of the sulfuric acid recovery process in such manner as to permit alkylation thereof in a separate reactor thereby to preserve the hydrocarbon values in the alkyl sulfates in the discard acid from the SARP process.

Another object of the invention is to provide means and methods of processing the RDC bottoms from or the extractor bottoms from a sulfuric acid recovery process without disturbing the basic equilibrium of said sulfuric acid recovery process and with only a minimum addition of apparatus and controls.

Another object of the invention is to provide improvements over my application Ser. No. 495,191, filed Oct. 12, 1965, entitled "Alkylation of Alkyl Sulfates," while conserving all of the improvements and values of that invention.

Other and further objects of the invention will appear in the course of the following description thereof.

(I) SULFURIC ACID ALKYLATION SYSTEM
(FIG. 1)

Referring to FIG. 1, therein is shown a quite standard sulfuric acid alkylation process, apparatus array and system wherein a circulating reaction vessel of the Stratco contactor type is employed with indirect heat exchange by effluent refrigeration of the reaction zone. With the exception of the linkages to the acid recovery system, the combination of apparatus and the flow line linkages are quite conventional.

Contactor 50, here shown as horizontal, has a circulating tube 51 with an impeller 52 at one end thereof driven by power source 53. Tube bundle 54 extends from header 55 which is divided by plate 56. In vessel 50, olefinic hydrocarbons are alkylated with isoparaffinic hydrocarbons in the presence of sulfuric acid catalyst in conventional manner with the reaction effluent, comprising alkylate, excess isoparaffinic hydrocarbons, acid catalyst, polymeric acid contaminants and the like being taken off overhead through line 57 to acid settler 58. The hydrocarbon phase of the reaction effluent is taken off overhead from the settler through line 59 and passed to the input side of the tube bundle after back pressure valve 60. The latter maintains the reaction under liquid phase conditions and the cooling after expansion through such valve of the hydrocarbon phase of the reaction effluent, according to well-established practice in effluent refrigeration, maintains the reaction zone temperature as desired. From the upper portion of header 55, line 61 carries the hydrocarbon phase effluent, both liquid and vapor, to trap and flash drum 62. This vessel has a divider 63 centrally thereof which divides the liquid in the sides thereof but permits communication thereover for vapor phase from both sides of the trap.

Vapor overhead from trap 62, comprising light excess isoparaffinic hydrocarbons and normal paraffinic hydrocarbons are taken off through line 64, passing to compressing stage 65 and condenser 66 and thence via line 67 to accumulator 68. Liquid from accumulator 68 may pass through line 69 through valve 70 back to trap 62 or alternately bottoms liquid is taken off through line 71 via pump 72 through a heat exchange step at 73 to depropanizer tower 74. The overhead from tower 74 is taken off through line 75 through condenser 76 and to vessel 77. Overhead from vessel 77 goes out of the system through line 78 as propane with the bottoms fraction returned to tower 74 via line 79 and pump 80. Bottoms from tower 74 are returned via line 81 through heat exchange at 73 and through cooling step 82 and valve 83 to the bottoms of trap 62. Reboiling takes place via lines 84 heated at 85.

The trap and flash drum bottoms on the left-hand side of the trap and flash drum in the view are linked with the acid recovery system to be described, but are returned and handled with respect to the alkylation reaction and associated systems via line 86, pump 87, valve 88 controlled by level control 89. Line 86 returns the trap bottoms, largely comprising unreacted isoparaffinic hydrocarbons, via input fitting 89, comprising a nozzle to a position interior of the circulating tube before impeller 52. On the right-hand side of barrier 63 in the view, trap bottoms are returned into the system via line 90 through pump 91 and valve 92, also controlled by level control 93. From valve 92, the trap bottoms are passed via line 93 through heat exchange at 94 to meet line 95 passing to a caustic wash step at 96 with a receiving vessel at 97.

From vessel 97, recycle line 98 splits into line 99 out of the system and line 100 which, via pump 101 returns the caustic wash bottoms through the mixer 96. Fresh caustic is input to the system through line 100a. Overhead from the caustic operation passes the alkylate through line 102 and mixing step 103 after input of fresh water at line 104 to vessel 105. Bottoms from vessel 105 go out of the system at line 106, with the ovehead passed through line 107 and via heating step 108 to deisobutanizer tower 109. The overhead from tower 109 is taken off through line 110, condensed at 111 and passed to vessel 112. Liquid from vessel 112 passes via line 113 to fractionation recycle line 114 via heat exchange at 115 to join the butane butylene input feed through line 116 (or alternatively recycles to vessel 109). This olefinic input and the excess isoparaffinic hydrocarbons returned via line 114 go through heat exchange at 94 to a separation step at 117 and thence through line 118 to input fitting 120 opposite fitting 89 in front of impeller 52. Water goes out of the system from separator 117 through line 121.

Part of the fractionation recycle may be diverted to the acid recovery system through line 122 after heat exchange at 115, as will be later described. Reboiling in the deisobutanizer tower is seen at 123 with heat applied at 124. Bottoms from the deisobutanizer tower pass via line 125 to debutanizer tower. The overhead from the latter is taken off through line 126 through condensing at 127, accumulation at 128 and recycle for refluxing through line 129 through pump 130. Normal butane is removed from the system through line 131. Alkylate bottoms leave the system through line 132 after cooling at 133 with reboiling of the lower fraction of the tower achieved at line 134 with heat applied at 135.

Fresh acid is supplied to the alkylation system of FIG. 1 through line 134, meeting acid recycle line 135 from settler 58 and passing through common line 136 into the circulating tube of the reactor. Line 137 splitting off from recycle line 135 carries used alkylation acid from acid settler 58 to the acid recovery system to be described on the left side of the flash drum 62, line 138 carries a bleed stream of hydrocarbon bottoms from flash drum 62 to the acid recovery system for cooling while line 139 returns same from the acid recovery system.

(II) SULFURIC ACID RECOVERY SYSTEM (FIG. 2 IN PART)

In FIG. 2, the center and left-hand portions thereof, therein is shown the optimal arrangement for a one-stage absorption system in a Sulfuric Acid Recovery System. The one-stage absorption system is shown primarily for simplicity and a two-stage countercurrent system as is Massa, supra is preferred. In the right hand portion of the figure there is seen an auxiliary alkylation reactor and settler coupled to the SARP system for alkylation of the extractor bottoms. The latter system will be described later, after the SARP system.

The absorption phase of the acid recovery system of FIG. 2 must be operated olefin-rich and thus there is a more considerable excess of olefin in the absorption settler overhead and a lesser percentage-wise production of dialkyl sulfates than would be the case in a two-stage countercurrent absorption stage. In this case, it is very essential that the sulfate and olefin in the overhead from the absorber settler be conserved in the system.

Absorber contactor 180 has driving motor 181 and heat exchange bundle served by header 182. Absorber 180 is preferably a reactor of the structure and action of reactor 50. Indirect heat exchange is provided of the contactor by line 183 which may come from the equivalent of trap 62 in FIG. 1, with take-off therefrom to one side of the header through line 184 and return out of the header through line 185. Line 183 passes through heat exchange at 186 of the line 187 carrying the isobutane stream to the extraction step corresponding to line 122 of FIG. 1. After heat exchange, line 183 joins line 185 and passes via line 188 back to the trap or flash drum corresponding to drum 62. The effluent from absorber 180 passes overhead through line 189 to settler 190. Bottoms from settler 190 are passed through line 191 and line 192 to the extraction vessel or rotating disc contactor 193 powered by driver 194. The alkylation acid is supplied from the acid settler through line 195 corresponding to line 137 in FIG. 1a. Pump 196 passes the alkylation acid through line 197 to the absorber contactor 180 and a slip stream through line 198 to the acid treater vessel 199. Propane-propylene feed is supplied to absorber contactor through input line 200. The overhead or effluent from the acid treater 199 passes through line 201 to settler 202 with settler bottoms recycled through line 203, pump 204 and line 205 back to the RDC. Overhead from the settler 202 is passed back to the alkylation reactor through line 206 (which leads into contactor 50 through line 86).

In the system of FIG. 2, the overhead line 207 from settler 190 passes the settler overhead alternatively through lines 208 and 209 or divided therebetween. Yet otherwise, all or part of the settler 190 overhead may go into line 206 via line 207a. Line 208 connects the RDC intermediate the connections of lines 192 and 187. Line 209 joins the effluent line 210 from the RDC, passing to the acid treater 199. In this manner, the propylene is maintained in contact with all acid values to maximize the quantity of alkyl sulfates produced and maintain the reaction in the direction of the dialkyl desired equilibrium. Likewise, the sulfate values in the settler overhead are conserved in the system and recycled to the alkylation reactor from the settler 202 overhead through line 206.

FIG. 2 typically represents a single stage absorption system where a rich propylene (paraffin poor) feed through line 200 is highly recommended with the overhead from the absorption step containing a substantial percentage of olefin and a relatively direct passage of same to alkylation being desirable. This represents a simplest and cheapest arrangement of absorption apparatus featuring complete recovery of the excess olefins and also sulfate values in the light phase from the absorption step in alkylation and, by virtue of the driving force of the high olefin content in the absorption step, the best conditions for adequate acid utilization.

Referring to FIG. 2, the back pressure valve seen in this figure on line 207 serves to maintain the illustrated absorber section or absorber contactor and associated settler under such pressure that all flowing materials in the absorber section are maintained in liquid phase. While it is possible to produce alkyl sulfates in either liquid or vapor phase, liquid phase operation is preferred for the maximum production of the dialkyl sulfate. In the liquid phase reaction, the absorption of propylene is quite rapid and relatively high yields are obtained in a relatively short time. In either phase, efficient contacting, relatively short reaction time and isothermal conditions are important for the latter. The vessels and apparatus system of FIG. 2 is necessarily operated under liquid phase conditions by virtue of the nature of their design. Other alternative equipment may be designed and employed for vapor phase operation.

Various olefinic hydrocarbons or mixtures thereof may be employed in the alkylation reaction and absorption reaction zone. Most important in commercial alkylation for motor and aviation fuel are those olefins containing three to five carbon atoms. Olefins readily convertible to the dialkyl sulfates include the low molecular weight primary and secondary isomers with propylene optimal of these.

FIG. 2 shows a system preferred when the absorber system olefin feed is olefin rich and a material presence of olefin in the absorber system light phase exists. Whether the absorption light phase goes directly to alkylation or passes thereto via the RDC (extractor section) or acid treater in whole or part, the olefin and alkyl sulfate values are conserved in the alkylation reaction zone in all cases. The presence of olefin from the absorber light phase in the RDC or acid treater affords the maximum exposure of acid values to olefin for reaction to dialkyl sulfates and, additionally, provides throughout the entire system a driving force to shift the reaction equilibrium toward dialkyl sulfate production.

A prime necessity of any absorber system is to convert the maximum possible of acid to dialkyl sulfate. Dialkyl sulfates are highly soluble in isobutane in the extraction step and are received in same. Monoalkyl sulfates are only slightly soluble in isobutane of the extraction step, so a portion of same, only, is recovered in extraction, but most are discharged from the system with the raffinate. Likewise, the water and acid oil are discharged with the raffinate. Because of this, the high dialkyl sulfate conversion is required in the system as the monoalkyl sulfate loss represents acid which could be recovered if the conversion to dialkyl sulfates were more efficient in the absorber system.

One way of achieving effective dialkyl conversion is to provide a high reaction driving force toward sulfate production by providing propylene excess in the absorber system over the quantity required to theoretically produce 100 percent dialkyl sulfates from the quantity of acid made available in the absorber system. A second mode is to provide a plurality of reaction or contacting stages in the absorber step arranged in counter current relationship such that the used alkylation or lean acid contacts the olefin depleted hydrocarbon fed into the absorber stage and vice versa, that is, the richest acid stream in turn contacts the fresh or strongest olefin feed. Such a countercurrent system provides the maximum incremental driving force for any given olefin feed concentration. The maximum acid conversion to dialkyl sulfate would occur with a combination of the above described two factors.

(III SARP DISCARD ACID PROCESSING (FIG. 2 IN PART)

Referring to the right-hand side of FIG. 2, isobutane from the alkylation unit and SARP spent acid from the extractor bottoms of the SARP unit are fed via lines 110 and 130, respectively, to the reactor 211 where they are brought into intimate contact in the presence of sulfuric acid catalyst. The isobutane from line 210 reacts with the alkyl sulfates present in the SARP spent acid from line 230 whereby to form an alkylate product and also form free sulfuric acid. The reaction mixture flows via line 212 to a settler 213 for separation of the hydrocarbon and acid phases. Alkylation acid from the alkylation reactor acid settler or fresh acid may be added to line 218 before it reaches reactor 211.

The hydrocarbon phase, containing alkylate and unreacted isobutane is returned via line 216 to the main alkylation system. The acid phase, on the other hand, containing sulfuric acid and the catalyst contaminants is recycled to the reactor via lines 217 and 218. A portion of the acid recycle stream is withdrawn from the system as reduced spent acid via line 219.

Tempearture control of the reactor may be achieved as shown in the drawing, by mixing cold effluent refrigerant recycle via line 220 with warmer deisobutanizer overhead in line 187 (the mixture passing into line 222, same drawn off by line 223 controlled by valve 224 before reaching RDC 193) to produce the desired reaction temperature in the reactor. Line 226 has temperature controlled valve 227 thereon with sensor 228 to line 210. otherwise, temperature control of the reactor may be achieved by indirect heat exchange through a refrigerated tube bundle 225 in the contactor.

The sulfuric acid recovery process (SARP) spent acid from the extractor bottoms (typically RDC 193) is not a suitable alkylation catalyst.

It is necessary, therefore, to provide an initial charge of catalyst to the reactor for start-up. This can be a portion of the catalyst from the main alkylation system charged through line 214 or fresh acid. As the reaction proceeds, the sulfuric acid released by alkylation of the alkyl sulfates is sufficient to maintain catalyst strength in the reactor and no further external acid is required. In such event valve 215 is closed during normal operation. However, in the event of upset or abnormal operation such that the release of free acid released from the alkylation of alkyl sulfates is not sufficient to maintain catalyst activity a quantity of alkylation acid or fresh acid may be added through 214 to maintain desired catalyst activity.

The calculations below illustrate the recoveries and performance possible based upon the quantity and composition of SARP spent acid from a commercial 5283 b.p.s.d. alkylation unit with an associated SARP unit. As indicated, the acid in the reactor-settler system (and consequently the spent acid) has titratable acidity of 91.8% and has adequate free sulfuric acid to maintain catalyst activity. Further, the hydrocarbon content has been substantially reduced, improving its burning properties in an acid plant. Enough olefin is recovered to produce 139 b.p.s.d. of alkylate, improving the over-all product yield on the plant.

RDC Botts—Cities Service Case II (rotating disc contactor bottoms)

|  | No. HR | No. H$_2$SO$_4$ | No. olefin |
| --- | --- | --- | --- |
| H$_2$SO$_4$ | 356 | 356 | 0 |
| DPS | 210 | 115 | 99 |
| IPS | 1,655 | 1,158 | 497 |
| Oil | 105 |  |  |
| H$_2$O | 42 |  |  |
| Totzl | 2372 | 1629 | 596 |

Assume all olefin reacted
Recovered acid, percent H$_2$SO$_4$=1629/1776=91.8%
Percent HC in spent acid 105/1776=6.0%
Percent HC in RDC Botts 701/2372=29.6%
Percent HC recovered=84%
Alky make
C$_3$=596/182.3=3.27 bbl./hr.=78 b.p.s.d.
Alky produced=78×1.78—139 b.p.s.d.

Looking at FIG. 2 and the right-hand side of the figure which structurally shows the novelty of the system (as compared to my Ser. No. 495,191), it should be noted that, basically, all SARP systems, whether (1) the countercurrent absorption system of Ser. No. 495,191 (2) the single stage absorption system of Ser. No. 495,191 with the RDC also as seen in FIG. 2 of this specification and (3) any single vessel reactor which can combine, staged or simultaneously, the absorption and extraction steps, all produce roughly the same spent acid reject from the extraction stage, which contains the acid contaminants, a little spent acid and mostly IPS (monopropyl sulfates).

The basic problem of this invention is to recover the olefinic hydrocarbon values from this contaminant carrying stream for the ultimate production of alkylate and thus produce a spent acid extractor reject stream which is substantially the same spent acid as the acid companies have been historically burning.

There must go out line 219 what comes in line 230 in terms of acid and out line 216 what comes in line 230 in the way of olefinic values.

Basically, the output of the alkylation system with classic SARP (my Ser. No. 495,191) plus the additional system of this disclosure is (1) alkylate, and (2) junk (spent acid with contaminants). The inputs to the alkylation system are olefin, isobutane and acid.

The effect on the alkylate of the present invention, comparing it to the effects of SARP (my 495,191) is that the old SARP lost the olefinic values in the RDC bottoms. Thus, in this invention, per unit of olefin fed, there is an increase in the ratio of alkylate to olefin entering the alkylation system, or olefin entering the SARP system. Further, in addition, there are super conditions in the 211 reactor or contactor in that (1) since there is relatively little olefin in the IPS from the RDC bottoms, and (2) there is a great excess of isobutane without any trouble. This means that one can produce very high grade alkylate in terms of octane number.

One can alkylate IPS without difficulty.

Another object and advantage of the invention, therefore, is to provide such a method of handling the discharge acid from the extraction step which takes a load off the absorption step because there is not a loss of the olefinic values in the IPS which constitute the extractor bottoms. That is, it is not so critical to produce DIPS (diisopropyl sulfates or dialkyl sulfates) in the absorption section and thus there need not be such an excess of olefin, nor does there necessarily need to be provided a countercurrent absorption reaction system, as the olefinic values will be recovered from the RDC bottoms even if said olefinic values are not transformed into DIPS in the absorption reactor(s).

Further, there is less criticality in the extraction step in the sense that DIPS that are not extracted overhead in the extraction vessel or RDC will be recovered by alkylation in the auxiliary reactor 211 which handles the RDC 193 bottoms.

If one reduces the efficiency of the absorption step, the extraction step, or both, in the SARP process, then the quantity of acid returned to alkylation is reduced. Therefore, the alkylation system is hurt to a certain extent. However, if one increases the relative quantity of IPS at reactor 211 re the quantity of contaminants carried in the RDC 193 bottoms, then said contaminants are a lesser problem at reactor 211 (see the above example relative to increasing (in the column lbs. hr.) the quantity 1655 (IPS) relative the quantity 147 (oil 105 plus H$_2$O 42)). In such case the recovered acid concentration or strength (91.8) goes up. One can shut off valve 125 to cease free acid feed to any degree desired (finally totally as the alkylation process releases free acid) when the system starts.

As noted above, there is a relatively small amount of olefin in the IPS at 211 and a relatively very great quantity of isobutane, which means there is a relatively little quantity of alkylate in 216 and a very high quantity of isobutane provided via line 210. In FIG. 1, one presumes about 15% alkylate at 59 (preferred operation). In FIG. 2, the effluent from settler 213 via line 216 in terms of alkylate in under 5%. Line 216 may join recycle line 206 as seen in FIG. 2, or lines 61 or 90 in FIG. 1.

One may cut back the isobutane feed to vessel 211 to get the effluent from settler 213 nearer the 15% alkylate content or near that from line 59. One would then use effluent refrigeration at tube bundle 225 and then pass the overhead line 216 to line 61.

One adds fewer contaminants back into the alkylation system if the effluent line 216 is under 5% alkylate.

One disperses the contaminants again in vessel 211 to some extent. They stay in the acid phase.

In a normal alkylation reactor (such as FIG. 1) considering SARP, in vessel 50 there is 50% true acid phase, once the system is going, and 50% hydrocarbon phase. Of the hydrocarbon phase 50%, some 75% of this is isobutane. In the feeds to vessel 50, the 10% of the feed is olefin, per se, 10% of the feeds are normal paraffins and 80% of the feeds are isobutane.

In normal alkylation, as carried out in the FIG. 1 reactor, to coin a perhaps oversimplified description, there is an immediate reaction of the olefin with the acid to make IPS. This reaction does not make DIPS because there is more acid than olefin. The IPS reacts with isobutane at the phase boundary (isobutane is insoluble in acid). The acid regenerates and the hydrocarbons together make alkylate. The alkylate migrates across the phase boundary into the hydrocarbon phase.

The same situation occurs at vessel 211 except for the fact that IPS is fed, not olefin.

One must maintain acid strength to keep it effective as a catalyst, that is, typically 87%, preferably above 89% and optimally 91%.

The effluent from vessel 211 in line 212 has two phases. The acid phase comprises (1) sulfuric acid, (2) acid contaminants (acid, oil and water) and (3) a very small quantity (counted as contaminants) percentage of IPS and DIPS. In the hydrocarbon phase, there is (1) isobutane, (2) normal paraffins from line 210 and (3) alkylate.

In settler 213, the net production of acid phase is separated out and withdrawn through line 219. In the specific example, supra, the net make of acid is 356+115+1158 to total 1629. Thus, there has been taken out of the RDC bottoms (line 230) 596 lbs. of olefin, ending up with 1629 lbs. of spent sulfuric acid catalyst out the drain line 219.

Acid consumption in alkylation is measured in pounds per gallon alkylate. Without classic (495,191) SARP, typical acid consumption is 0.7 p.p.g. alkylate. With classic (495,191) SARP, typical acid consumption is 0.23 p.p.g. alkylate.

One may compare the acid in line 137 *without SARP* with the acid in line 219. The acid oil and water (contaminants) are in a considerably higher percentage in the latter.

The acid discard from line 219 is not regarded as a particularly "SARPABLE" acid. The fact that one is at the IPS stage in line 230 plus the presence of large isobutane quantity permits cheap alkylation at 211 since the whole reaction at this point is so small with respect to the rest of the plant. However, it does take care of the olefin loss at 230 and further makes the spent acid at 219 conveniently burnable in the acid handling industry.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompany drawings is to be interpreted as illustrative and not in a limiting sense.

I claim:

1. Reacting olefinic and isoparaffinic hydrocarbons in a first alkylation reaction zone in the presence of sulfuric acid catalyst to form an alkylate product,
    reacting an olefin containing hydrocarbon feed stream with used sulfuric acid catalyst containing polymeric organic contaminants and water from said first alkylation reaction zone whereby to produce dialkyl sulfates in an absorption reaction zone,
    separating the absorption reaction mixture into a hydrocarbon phase comprising a quantity of normal paraffinic hydrocarbons, olefinic hydrocarbons and dialkyl sulfates, and an acidic phase comprising predominantly dialkyl sulfates, monoalkyl sulfates, acid, water and polymeric organic contaminants,
    extracting said acidic phase with light hydrocarbons to form an extract phase comprising dialkyl sulfates and passing said extract phase to said alkylation zone,
    passing the acidic phase from said extracting step to a second and separate alkylation zone,
    said acidic phase comprising water, polymeric organic contaminants and a significant quantity of monoalkyl sulfates,
    alkylating said acidic phase therein with an isoparaffin to produce a separate alkylation product, said sulfates in said acidic phase being the sole olefinic reactant,
    the sulfuric acid catalyst in the separate and second alkylation reaction zone being derived from said sulfates during the alkylation reaction.

2. A process as in claim 1 including passing a reaction effluent from said second and separate alkylation reaction zone to a separating zone, and
    removing overhead from said separating zone a light hydrocarbon phase including excess isoparaffinic hydrocarbons and alkylate and removing as a heavier acid phase from said separating zone the acid, water and polymeric organic contaminants.

3. A process as in claim 2 including passing the overhead hydrocarbon phase from said separating zone to said first alkylation reaction zone as a source of isoparaffinic hydrocarbons therefor.

4. A process as in claim 2 including recycling a portion of said heavier acid phase from said second alkylation separating zone to the separate and second alkylation reaction zone and withdrawing a portion thereof from the system.

5. A process for alkylating monoalkyl sulfates comprising the steps of::
    absorbing an olefin containing hydrocarbon feed stream with used sulfuric acid catalyst containing polymeric organic contaminants and water whereby to produce dialkyl sulfates in an absorption reaction zone,
    separating the absorption reaction mixture into a hydrocarbon phase comprising a quantity of normal paraffinic hydrocarbons, olefinic hydrocarbons and dialkyl sulfates, and an acidic phase comprising predominantly dialkyl sulfates, monoalkyl sulfates, acid, water and polymeric organic contaminants,
    extracting said acidic phase with light hydrocarbons to form an extract phase comprising dialkyl sulfates,
    passing the acidic phase from said extracting step to an alkylation zone, said acidic phase comprising water, polymeric organic contaminants and a significant quantity of monoalkyl sulfates, alkylating said acidic phase therein with an isoparaffin to produce an alkylation product, said sulfates in said acidic phase being the sole olefinic reactant, the sulfuric acid catalyst in the alkylation reaction zone being derived from said sulfates during the alkylation reaction.

References Cited

UNITED STATES PATENTS

| | | | |
|---|---|---|---|
| 3,234,301 | 2/1966 | Goldsby | 260—683.62 |
| 3,422,164 | 1/1969 | Goldsby | 260—683.61 |
| 3,428,705 | 2/1969 | Goldsby | 260—683.61 |
| 3,442,972 | 5/1969 | Massa | 260—683.61 |

DELBERT E. GANTZ, Primary Examiner

G. J. CRASANAKIS, Assistant Examiner

U.S. Cl. X.R.

260—683.61